(12) United States Patent
Park et al.

(10) Patent No.: US 11,779,884 B2
(45) Date of Patent: Oct. 10, 2023

(54) REVERSE OSMOSIS SYSTEM AND SEAWATER DESALINATION SYSTEM HAVING THE SAME

(71) Applicant: DOOSAN ENERBILITY CO., LTD, Changwon-si (KR)

(72) Inventors: Yong Hae Park, Busan (KR); Wee Kwan Kang, Yongin (KR); Hye Ryun Ahn, Suwon (KR); Young Geun Lee, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 309 days.

(21) Appl. No.: 17/334,289

(22) Filed: May 28, 2021

(65) Prior Publication Data

US 2021/0379531 A1    Dec. 9, 2021

(30) Foreign Application Priority Data

Jun. 3, 2020  (KR) ........................ 10-2020-0067092

(51) Int. Cl.
*B01D 61/08*    (2006.01)
*B01D 61/06*    (2006.01)
(Continued)

(52) U.S. Cl.
CPC ........... *B01D 61/08* (2013.01); *B01D 61/026* (2022.08); *B01D 61/04* (2013.01); *B01D 61/06* (2013.01);
(Continued)

(58) Field of Classification Search
CPC ...... B01D 61/08; B01D 61/026; B01D 61/04; B01D 61/06; B01D 63/10;
(Continued)

(56) References Cited

U.S. PATENT DOCUMENTS

2004/0211726 A1* 10/2004 Baig ..................... B01D 63/02
210/640

FOREIGN PATENT DOCUMENTS

JP        63039686 A     2/1988
JP        2001137672 A   5/2001
(Continued)

OTHER PUBLICATIONS

KR Office Action dated Mar. 3, 2022.
KR Decision to Grant dated Apr. 25, 2022.
KR Office Action dated Oct. 25, 2021.

*Primary Examiner* — Waqaas Ali
(74) *Attorney, Agent, or Firm* — Harvest IP Law, LLP

(57) ABSTRACT

A reverse osmosis system for a seawater desalination system is provided. The reverse osmosis system includes: a high pressure pump configured to supply pretreated seawater at high pressure; a reverse osmosis apparatus configured to desalinate by reverse osmosis the seawater supplied from the high pressure pump; and a pressure exchanger connected to a high salinity water outlet of the reverse osmosis apparatus and configured to recover part of pressure of discharged high salinity water to the reverse osmosis apparatus, wherein the reverse osmosis apparatus includes: a vessel in which a plurality of reverse osmosis membrane units are arranged in a first stage and a second stage; an inflow and outflow portion coupled to a first end of the vessel and connected to a seawater inlet and a high salinity water outlet; a partition wall configured to partition an inner space of the inflow and outflow portion into two spaces; and a transport space portion coupled to a second end of the vessel and configured to guide the seawater moved from a plurality of reverse osmosis membrane units arranged in the first stage to move to a plurality of reverse osmosis membrane units arranged in the second stage.

20 Claims, 7 Drawing Sheets

(51) Int. Cl.
  *B01D 61/04*      (2006.01)
  *C02F 1/00*       (2023.01)
  *C02F 1/44*       (2023.01)
  *B01D 61/02*      (2006.01)
  *B01D 63/10*      (2006.01)
  *C02F 103/08*     (2006.01)

(52) U.S. Cl.
  CPC .............. *B01D 63/10* (2013.01); *C02F 1/001* (2013.01); *C02F 1/441* (2013.01); *B01D 2311/2649* (2013.01); *B01D 2317/02* (2013.01); *B01D 2317/04* (2013.01); *C02F 2103/08* (2013.01); *C02F 2301/08* (2013.01); *C02F 2303/10* (2013.01)

(58) Field of Classification Search
  CPC ........ B01D 2311/2649; B01D 2317/02; B01D 2317/04; B01D 2319/022; B01D 2319/025; B01D 61/025; B01D 61/10; C02F 1/001; C02F 1/441; C02F 2103/08; C02F 2301/08; C02F 2303/10; C02F 2201/004; C02F 2201/007; Y02W 10/30; Y02A 20/131
  See application file for complete search history.

(56) References Cited

FOREIGN PATENT DOCUMENTS

| | | |
|---|---|---|
| JP | 2012076073 A | 4/2012 |
| JP | 2012176370 A | 9/2012 |
| KR | 101402345 B1 | 7/2014 |
| KR | 1020170140920 A | 12/2017 |

\* cited by examiner

REVERSE OSMOSIS SYSTEM AND SEAWATER DESALINATION SYSTEM HAVING THE SAME

CROSS REFERENCE TO RELATED APPLICATION

This application claims priority to Korean Patent Application No. 10-2020-0067092, filed on Jun. 3, 2020, the disclosures of which is incorporated herein by reference in its entirety.

FIELD

Apparatuses and methods consistent with exemplary embodiments relate to a reverse osmosis system and a seawater desalination system having the same.

BACKGROUND

In general, a processing system for desalinating seawater is configured to primarily remove impurities by pumping seawater stored in a storage tank with a predetermined volume through a transport pump to sand or a multi-layered filter in a pretreatment step. And if necessary, the seawater desalination system is configured to remove organic impurities by passing the seawater through an activated carbon filter, and finally remove fine impurities by passing the seawater through a cartridge filter, a bag filter, or the like.

Pretreated water subjected to such pretreated process is introduced into a reverse osmosis filter for desalination and is separated into desalinated permeated water and concentrated water, and the concentrated water is discharged, and the desalinated permeated water is mineralized and sterilized in a post-treatment step and flows into a final treatment storage tank.

A related art reverse osmosis filter is configured such that a plurality of reverse osmosis membrane units are arranged by being inserted into a vessel. In detail, when seawater introduced into a first side of each of the reverse osmosis membrane units is moved toward a second side of the reverse osmosis membrane unit, the seawater passes through a reverse osmosis membrane by reverse osmosis and is collected to a tube arranged at a center of the reverse osmosis membrane unit, thereby being discharged through the second side of the reverse osmosis membrane unit.

However, the related art reverse osmosis filter, especially a reverse osmosis filter with a large treatment capacity, has problems such as a bulky design, high energy consumption rate, large maintenance cost, and difficulty in operation and maintenance.

In addition, when the plurality of reverse osmosis membrane units are installed in serial connection, there is a large load on a reverse osmosis membrane unit arranged at the front end of the reverse osmosis membrane units, and as the reverse osmosis membrane units extend to the rear end, a reverse osmosis membrane unit hardly produces permeated water.

Furthermore, when the reverse osmosis membrane units are inserted into the vessel, an O-ring provided at an outer circumferential surface of the vessel is twisted so that seawater leaks into the vessel and tube pressure is lost.

SUMMARY

Aspects of one or more exemplary embodiments provide a reverse osmosis system and a seawater desalination system having the same. In particular, when designing a high capacity reverse osmosis apparatus, a second stage is provided in the reverse osmosis apparatus so that the reverse osmosis apparatus performs efficient filtration through a reverse osmosis membrane, reduces maintenance costs by extending the life of the reverse osmosis membrane and makes it easy to replace a reverse osmosis membrane unit. Also, pressure exchangers are connected to a seawater inlet and outlet and a transport space portion so that primary high salinity water in the transport space portion is diluted and fed to a reverse osmosis membrane unit arranged at the second stage, thereby recovering part of pressure energy.

Additional aspects will be set forth in part in the description which follows and, in part, will become apparent from the description, or may be learned by practice of the exemplary embodiments.

According to an aspect of an exemplary embodiment, there is provided a reverse osmosis system for a seawater desalination system including: a high pressure pump configured to supply pretreated seawater at high pressure; a reverse osmosis apparatus configured to desalinate by reverse osmosis the seawater supplied from the high pressure pump; and a pressure exchanger connected to a high salinity water outlet of the reverse osmosis apparatus and configured to recover part of pressure of discharged high salinity water to the reverse osmosis apparatus, wherein the reverse osmosis apparatus may include: a vessel in which a plurality of reverse osmosis membrane units may be arranged in a first stage and a second stage; an inflow and outflow portion coupled to a first end of the vessel and connected to a seawater inlet and the high salinity water outlet; a partition wall configured to partition an inner space of the inflow and discharge portion into two spaces; and a transport space portion coupled to a second end of the vessel and configured to guide the seawater moved from a plurality of reverse osmosis membrane units arranged in the first stage to move to a plurality of reverse osmosis membrane units arranged in the second stage.

The plurality of reverse osmosis membrane units arranged in the vessel may include: a plurality of first reverse osmosis membrane units arranged in a space of the first stage and configured to reduce salinity of the seawater supplied from the inflow and discharge portion; and a plurality of second reverse osmosis membrane units arranged in a space of the second stage and configured to reduce salinity of the seawater supplied from the transport space portion.

The reverse osmosis system may further include first treated water tubes connected to first ends of the plurality of first reverse osmosis membrane units and connected to an outside of the vessel by passing through the inflow and discharge portion, and second treated water tubes connected to first ends of the plurality of second reverse osmosis membrane units and connected to the outside of the vessel by passing through the inflow and discharge portion.

The plurality of first and second reverse osmosis membrane units may be arranged in a cassette type in which the reverse osmosis membrane units may be arranged in parallel to be spaced apart from each other in the cassette.

The plurality of first and second reverse osmosis membrane units may be configured such that 3 to 10 reverse osmosis membrane units having a regular hexagonal, square, or regular triangular cross-section are connected to each other in series.

The plurality of first and second reverse osmosis membrane units may be configured in a form of a tube sheet in which a sheet-shaped reverse osmosis membrane unit may be wound around a tube having a plurality of through holes.

The reverse osmosis system may further include a feed pump configured to supply the pretreated seawater; the high pressure pump configured to pump the seawater supplied from the feed pump at high pressure; a first pressure exchanger configured to perform pressure exchange between a part of the seawater supplied from the feed pump and a part of the high salinity water discharged from the high salinity water outlet; and a second pressure exchanger configured to perform pressure exchange between a part of the seawater supplied from the feed pump and a part of the high salinity water discharged from the high salinity water outlet and to introduce the seawater into the transport space portion.

The reverse osmosis system may further include: a first booster pump configured to pump the seawater supplied from the feed pump and passed through the first pressure exchanger at high pressure to move to the inflow and discharge portion; and a second booster pump configured to pump the seawater supplied from the feed pump and passed through the second pressure exchanger at high pressure to move to the transport space portion.

Each of the reverse osmosis membrane units may include: a cylindrical casing portion having a reverse osmosis membrane therein; and a head portion coupled to one end of the casing portion and having an outlet hole at a center portion thereof and inlet holes at positions around the center portion.

One of the reverse osmosis membrane units and another reverse osmosis membrane unit may be connected to each other in series by an adapter that may be inserted into outlet holes of both the reverse osmosis membrane units to connect central flow paths thereof to each other.

According to an aspect of another exemplary embodiment, there is provided a seawater desalination system of the present disclosure including: a pretreatment apparatus configured to intake seawater and filter impurities in the introduced seawater; a cartridge filter configured to re-filter the water pretreated by the pretreatment apparatus; and a reverse osmosis system configured to receive the water filtered by the cartridge filter from a high pressure pump to produce fresh water by reverse osmosis, wherein the reverse osmosis system may include: a vessel in which a plurality of reverse osmosis membrane units may be arranged in a first stage and a second stage; an inflow and outflow portion coupled to a first end of the vessel and connected to a seawater inlet and a high salinity water outlet; a partition wall configured to partition an inner space of the inflow and discharge portion into two spaces; and a transport space portion coupled to a second end of the vessel and configured to guide the seawater moved from a plurality of reverse osmosis membrane units arranged in the first stage to move to a plurality of reverse osmosis membrane units arranged in the second stage.

The plurality of reverse osmosis membrane units arranged in the vessel may include: a plurality of first reverse osmosis membrane units arranged in a space of the first stage and configured to reduce salinity of the seawater supplied from the inflow and discharge portion; and a plurality of second reverse osmosis membrane units arranged in a space of the second stage and configured to reduce salinity of the seawater supplied from the transport space portion.

The reverse osmosis system may further include first treated water tubes connected to first ends of the plurality of first reverse osmosis membrane units and connected to an outside of the vessel by passing through the inflow and discharge portion, and second treated water tubes connected to first ends of the plurality of second reverse osmosis membrane units and connected to the outside of the vessel by passing through the inflow and discharge portion.

The plurality of first and second reverse osmosis membrane units may be arranged in a cassette type in which the reverse osmosis membrane units may be arranged in parallel to be spaced apart from each other in the cassette.

The plurality of first and second reverse osmosis membrane units may be configured such that 3 to 10 reverse osmosis membrane units having a regular hexagonal, square, or regular triangular cross-section are connected to each other in series.

The plurality of first and second reverse osmosis membrane units may be configured in a form of a tube sheet in which a sheet-shaped reverse osmosis membrane unit may be wound around a tube having a plurality of through holes.

The reverse osmosis system may further include: a feed pump configured to supply the pretreated seawater; the high pressure pump configured to pump the seawater supplied from the feed pump at high pressure; a first pressure exchanger configured to perform pressure exchange between a part of the seawater supplied from the feed pump and a part of the high salinity water discharged from the high salinity water outlet; and a second pressure exchanger configured to perform pressure exchange between a part of the seawater supplied from the feed pump and a part of the high salinity water discharged from the high salinity water outlet to introduce the seawater into the transport space portion.

The reverse osmosis system may further include a first booster pump configured to pump the seawater supplied from the feed pump and passed through the first pressure exchanger at high pressure to move to the inflow and discharge portion; and a second booster pump configured to pump the seawater supplied from the feed pump and passing through the second pressure exchanger at high pressure to move to the transport space portion.

Each of the reverse osmosis membrane units may include: a cylindrical casing portion having a reverse osmosis membrane therein; and a head portion coupled to one end of the casing portion and having an outlet hole at a center portion thereof and inlet holes at positions around the center portion.

One of the reverse osmosis membrane units and another reverse osmosis membrane unit may be connected to each other in series by an adapter that is inserted into outlet holes of both the reverse osmosis membrane units to connect central flow paths thereof to each other.

According to the reverse osmosis system and the seawater desalination system having the same of one or more exemplary embodiments, the second stage may be provided in the design of the high capacity reverse osmosis apparatus, thereby performing filtration by the reverse osmosis membrane.

In addition, the pressure exchangers may be connected to the seawater inflow and outflow portion and the transport space portion, so that primary high salinity water in the transport space portion may be diluted and fed to the reverse osmosis membrane unit arranged in the second stage, thereby recovering part of pressure energy.

Furthermore, the life of the reverse osmosis membrane is extended and the replacement of the reverse osmosis membrane unit is easy, thereby reducing maintenance costs.

BRIEF DESCRIPTION OF THE DRAWINGS

The above and other aspects will be more clearly understood from the following description of the exemplary embodiments with the accompanying drawings, in which.

DETAILED DESCRIPTION

Figure 1:
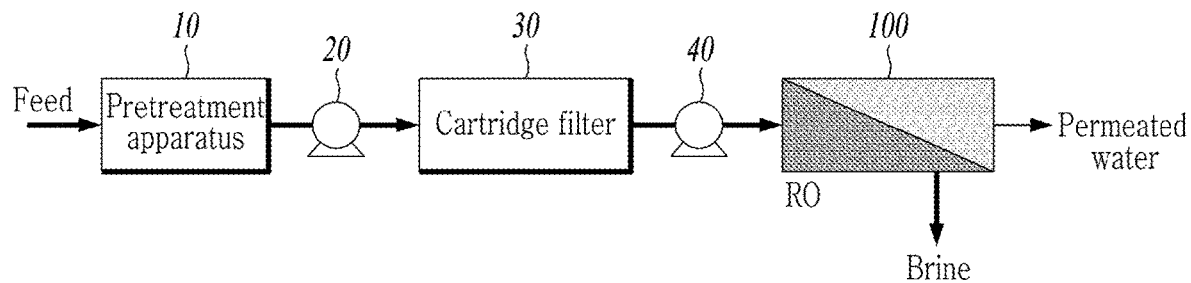
FIG. 1 is a view schematically showing a seawater desalination system according to an exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific embodiments, but they should be construed to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well, unless the context clearly indicates otherwise. The terms such as "comprise," "include", "have/has" should be construed as designating that there are such features, integers, steps, operations, elements, components, and/or combinations thereof, but not to preclude the presence or possibility of adding of one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Hereinbelow, exemplary embodiments will be described in detail with reference to the accompanying drawings. The same reference numerals will be used throughout the drawings and the description to refer to the same or like elements or parts. In certain embodiments, a detailed description of functions and configurations well known in the art may be omitted to avoid obscuring appreciation of the disclosure by a person of ordinary skill in the art. For the same reason, some elements may be exaggerated, omitted, or schematically illustrated in the accompanying drawings.

FIG. 1 is a view schematically showing a seawater desalination system according to an exemplary embodiment.

Referring to FIG. 1, the seawater desalination system may include a pretreatment apparatus 10, a cartridge filter 30, and a reverse osmosis apparatus 100.

The pretreatment apparatus 10 is configured to intake seawater and filter impurities in the introduced water. An intake device provided to intake seawater may be arranged in front of the pretreatment apparatus 10.

Pretreatment process of the pretreatment apparatus 10 includes a precipitation treatment, a filtration treatment, and a chemical treatment. The precipitation treatment and the filtration treatment are performed to prevent contamination of membranes by removing suspended solid in raw water. The chemical treatment is performed to control water quality of feed water so as to maintain performance of a reverse osmosis membrane. Further, high performance pretreatment is necessary to prevent contamination of the reverse osmosis membrane.

The cartridge filter 30 is configured to re-filter the pretreated and filtered water to remove fine impurities from the water. A feed pump 20 may be arranged in front of the cartridge filter 30 to feed the pretreated water to the cartridge filter 30 at a predetermined pressure.

The reverse osmosis apparatus 100 is configured to receive the water filtered through the cartridge filter 30 by a high pressure pump 40 to generate fresh water by reverse osmosis (RO). RO is a phenomenon in which pure solvent escapes from a solution through a semipermeable membrane when a pressure higher than osmotic pressure is applied. Seawater may be desalinated using RO. In order to cause RO, the high pressure pump 40 for supplying filtered water at a pressure higher than the osmotic pressure of seawater is arranged in front of the reverse osmosis apparatus 100.

When the feed seawater passes through the reverse osmosis apparatus 100, the seawater is converted to high salinity water, and the water passing through the reverse osmosis membrane is converted to permeated water. A post-treatment apparatus may be arranged in rear of the reverse osmosis apparatus 100 to re-treat the filtered permeated water. The post-treatment apparatus may perform pH adjustment, mineral injection, and chlorination.

Figure 2:
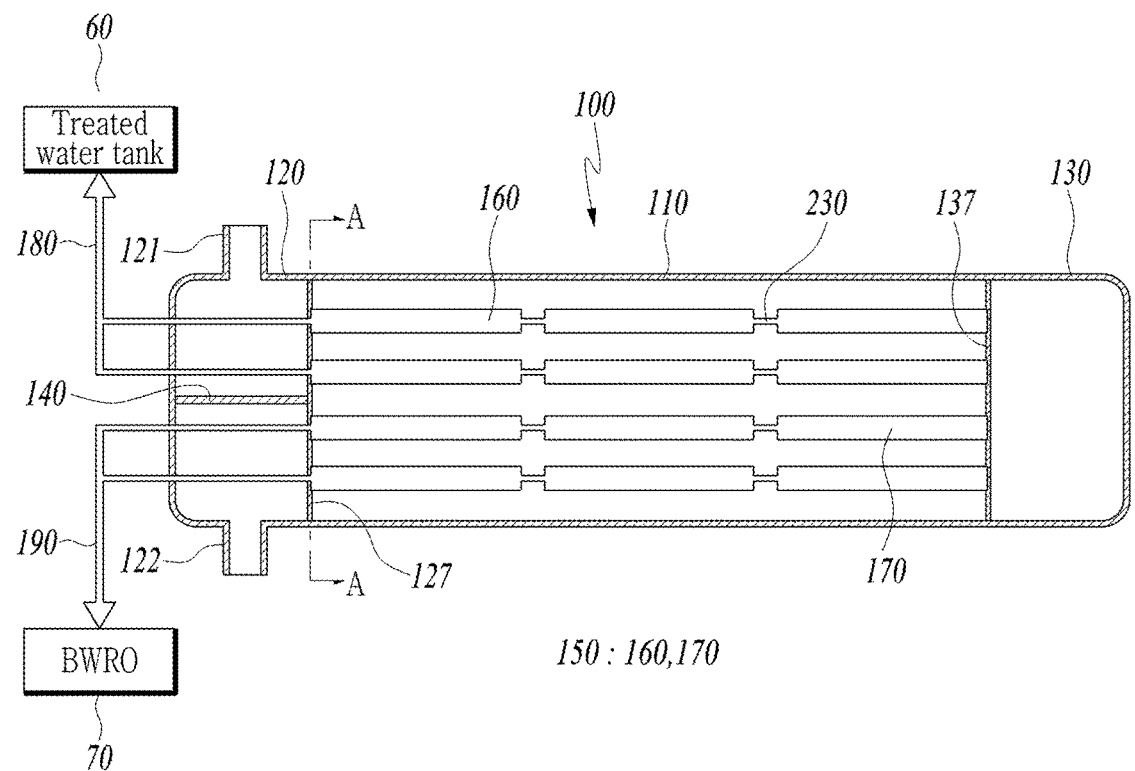
FIG. 2 is a view schematically showing a reverse osmosis apparatus according to the exemplary embodiment.
Figure 3:
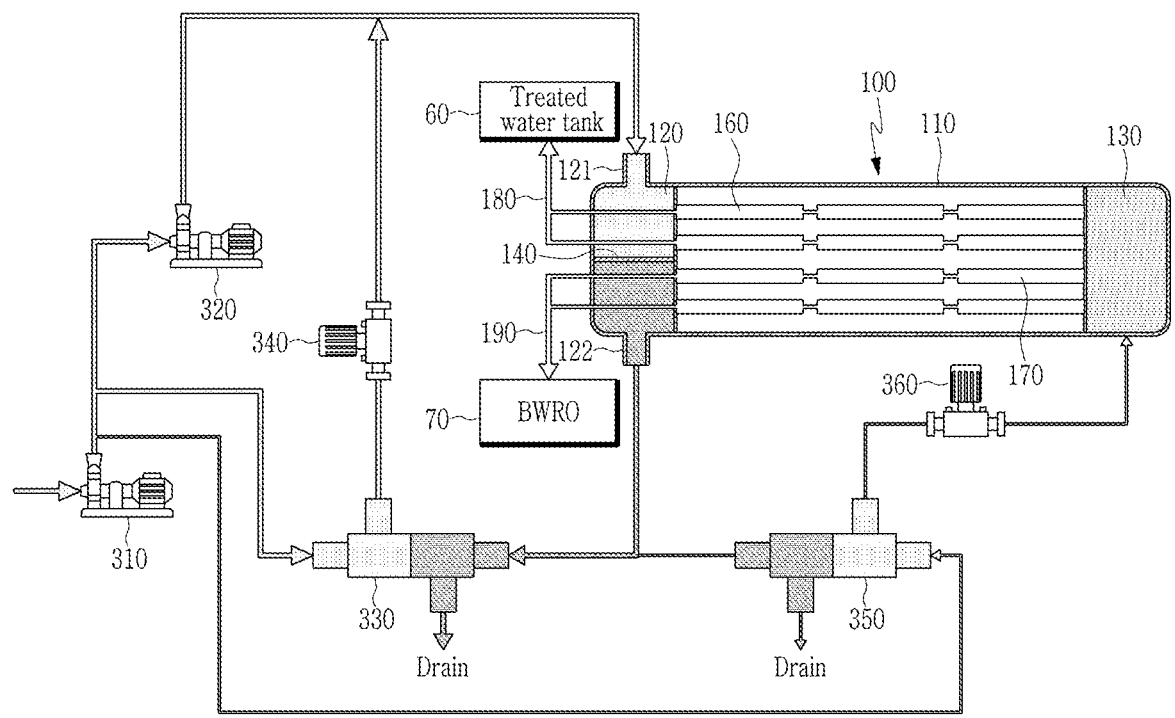
FIG. 3 is a view schematically showing a reverse osmosis system including the reverse osmosis apparatus in FIG. 2.
Figure 4A:
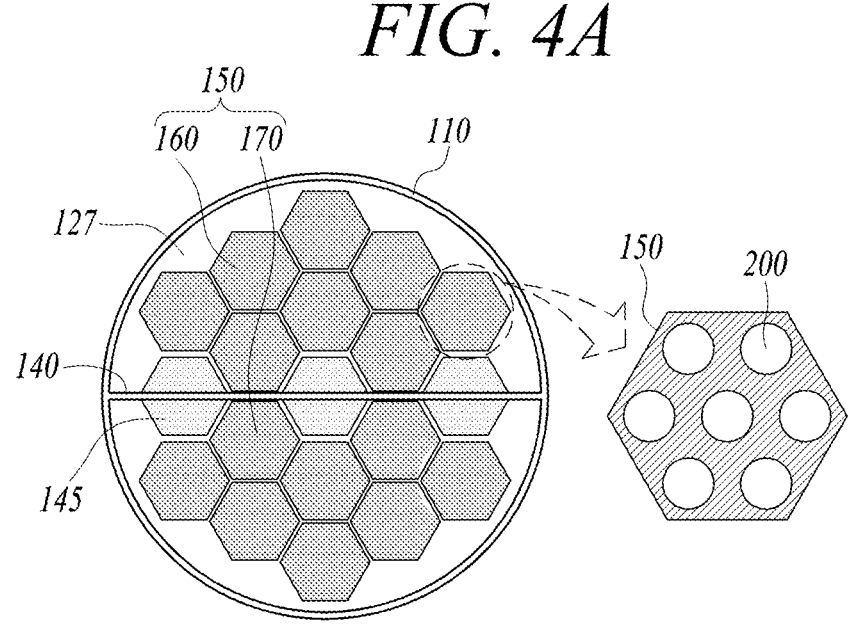
FIG. 4A is a cross-sectional view taken along line A-A in FIG. 2.
Figure 4B:
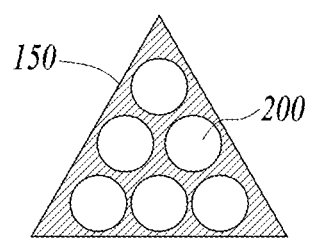
FIG. 4B is a cross-sectional view showing another form of a cassette module.
Figure 5A:
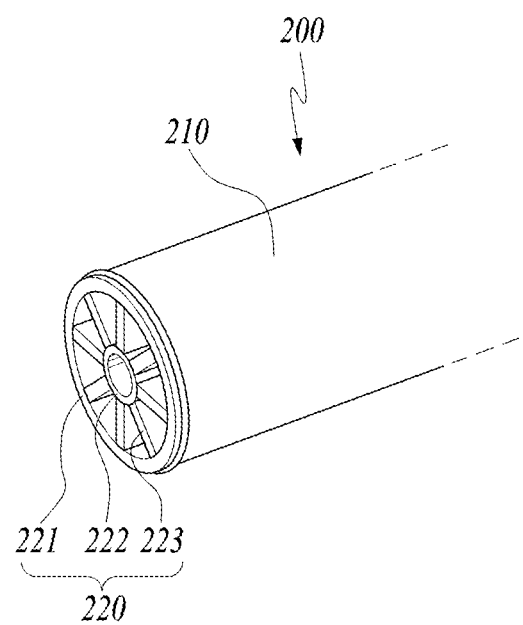
FIG. 5A is a partial perspective view showing a reverse osmosis membrane unit according to the exemplary embodiment.
Figure 5B:
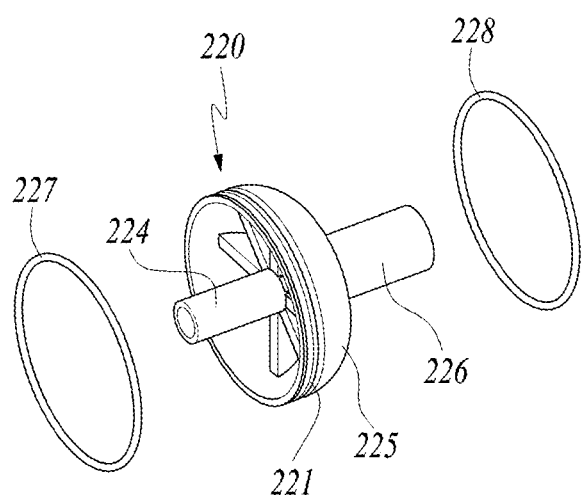
FIG. 5B is a disassembled perspective view showing a head portion.
Figure 6A:
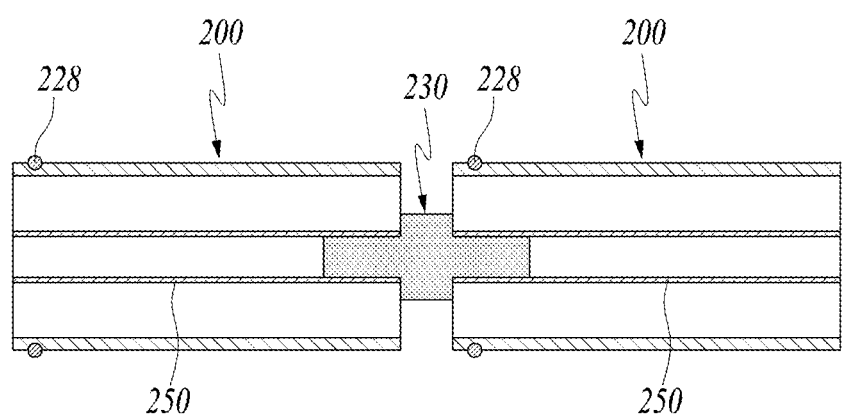
FIG. 6A is a view schematically showing two reverse osmosis membrane units connected to each other by an adapter.
Figure 6B:
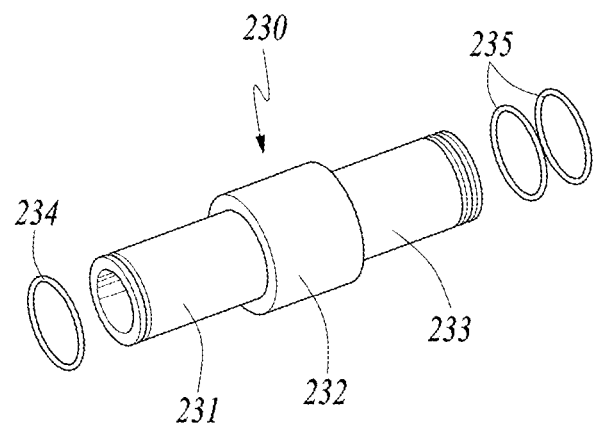
FIG. 6B is a disassembled perspective view showing the adapter.

FIG. 2 is a view schematically showing the reverse osmosis apparatus 100 according to the exemplary embodiment. FIG. 3 is a view schematically showing the reverse osmosis system including the reverse osmosis apparatus in FIG. 2. FIG. 4A is a cross-sectional view taken along line A-A in FIG. 2, and FIG. 4B is a cross-sectional view showing another form of a cassette module. FIG. 5A is a partial perspective view showing a reverse osmosis membrane unit according to the exemplary embodiment, and FIG. 5B is a disassembled perspective view showing a head portion. FIG. 6A is a view schematically showing two reverse osmosis membrane units connected to each other by an adapter, and FIG. 6B is a disassembled perspective view showing the adapter.

Referring to FIG. 3, the reverse osmosis system includes high pressure pump 320 configured to feed pretreated seawater at high pressure, the reverse osmosis apparatus 100 configured to desalinate the seawater supplied from the high pressure pump 320 by reverse osmosis, pressure exchangers 330 and 350 connected to a high salinity water outlet 122 of the reverse osmosis apparatus 100 and configured to recover portion of the pressure of the discharged high salinity water to the reverse osmosis apparatus 100.

Referring to FIG. 2, the reverse osmosis apparatus 100 includes a vessel 110 in which a plurality of reverse osmosis membrane units 150 are arranged in a first stage and a second stage, an inflow and outflow portion 120 coupled to a first end of the vessel 110 and connected to a seawater inlet 121 and a high salinity water outlet 122, a partition wall 140 partitioning an inner space of the inflow and outflow portion 120 into two spaces, a transport space portion 130 coupled to a second end of the vessel 110 and configured to guide the seawater moving from a plurality of reverse osmosis membrane units 160 arranged at a first stage to flow into a plurality of reverse osmosis membrane units 170 arranged at a second stage.

The vessel 110 is provided horizontally on the ground and has a cylindrical shape with holes corresponding to each reverse osmosis membrane unit 150 on both end surfaces of the cylindrical shape. Inside the vessel 110, the plurality of reverse osmosis membrane units 150 may be arranged in a longitudinal direction of the vessel 110. As shown in FIG. 4A, in each reverse osmosis membrane unit 150, a plurality of reverse osmosis membrane units 200 may be arranged to be spaced apart from each other.

The partition wall 140 is provided in a center of the inner space of the inflow and outflow portion 120 to partition the inner space of the inflow and outflow portion 120 into the first stage and the second stage. Alternatively, the partition wall 140 may be arranged vertically in the center of the cylindrical inflow and outflow portion 120, and may partition the inner space of the inflow and outflow portion 120 into the first stage space on the left side and the second stage space on the right side.

The inflow and outflow portion 120 to which the seawater inlet 121 and the high salinity water outlet 122 are connected may be coupled to the first end of the vessel 110. For example, the seawater with high pressure may be pumped to the inflow and outflow portion 120 through the seawater inlet 121 by the high pressure pump 40, and high salinity or concentrated water passing through the first reverse osmosis membrane units 160 arranged at the first stage and the second reverse osmosis membrane units 170 arranged at the second stage may be discharged through the high salinity water outlet 122.

The entire transport space portion 130 may be removably coupled to the second end of the vessel 110. On the other hand, the transport space portion 130 may have a sealable door provided integrally with a first end of the transport space portion 130 to allow a person to enter. A manager can easily perform maintenance tasks such as replacing the reverse osmosis membrane units 150 by entering the removable or openable transport space portion 130.

The transport space portion 130 may guide the water moving from the plurality of first reverse osmosis membrane units 160 arranged at the first stage to flow into the plurality of reverse osmosis membrane units 170 arranged at the second stage. The seawater introduced into the inflow and outflow portion 120 through the seawater inlet 121 may move toward the transport space portion 130 and pass through the plurality of first reverse osmosis membrane units 160 arranged at the first stage, and in the transport space portion 130, the water may pass through the plurality of second reverse osmosis membrane units 170 arranged at the second stage and move toward the inflow and outflow portion 120.

The plurality of reverse osmosis membrane units 150 may include the plurality of first reverse osmosis membrane units 160 stacked in the first stage and the plurality of second reverse osmosis membrane units 170 stacked in the second stage. Referring to FIG. 2, as seawater moves from left to right in the plurality of first reverse osmosis membrane units 160, fresh water is generated by RO filtration. High salinity water flowing into the transport space portion 130 while passing through the plurality of first reverse osmosis membrane units 160 moves from right to left in the plurality of second reverse osmosis membrane units 170, so that fresh water is generated by RO filtration.

The reverse osmosis apparatus 100 may further include first treated water tubes 180 and second treated water tubes 190. The first treated water tubes 180 are connected to first ends of the plurality of first reverse osmosis membrane units 160, and are connected to the outside of the vessel 110 by passing through the inflow and outflow portion 120. The second treated water tubes 190 are connected to first ends of the plurality of second reverse osmosis membrane units 170, and are connected to the outside of the vessel 110 by passing through the inflow and outflow portion 120.

Permeated water generated from the plurality of first reverse osmosis membrane units 160 may be transported to a treated water tank 60 through the first treated water tubes 180 connected to the first reverse osmosis membrane units 160.

Further, permeated water generated from the plurality of second reverse osmosis membrane units 170 may be transported to a brackish water reverse osmosis (BWRO) 70 through the second treated water tubes 190 connected to the second reverse osmosis membrane units 170.

BWRO means brackish water reverse osmosis, and brackish water refers to water having a salinity between seawater and fresh water. A salinity of the permeated water generated from the second reverse osmosis membrane units 170 by RO is higher than a salinity of the permeated water generated from the first reverse osmosis membrane units 160. That is, the water increased in salinity during primarily filtration in the first stage is secondarily reverse-permeated in the second stage. Accordingly, a salinity of the permeated water may be reduced by allowing the permeated water generated from the second reverse osmosis membrane units 170 to pass through the secondary RO process in the BWRO 70.

The plurality of reverse osmosis membrane units 150 may be formed in a cassette type, and the reverse osmosis membrane units are arranged in parallel to be spaced apart from each other in the cassette. The plurality of reverse osmosis membrane units 150 may be arranged in a cassette module, and the plurality of reverse osmosis membrane units 200 are arranged to be spaced apart from each other in the cassette having a cross-section of at least one of a regular hexagon, a square, and a regular triangle. Furthermore, the plurality of reverse osmosis membrane units 150 may be configured such that 3 to 10 cassette modules are connected to each other in series. In FIG. 2, one set of the reverse osmosis membrane units 150 is illustrated as a configuration including four cassette modules connected in series.

Referring to FIG. 4A, the plurality of cassette modules 150 may be formed to have a regular hexagonal cross-sectional shape. When each of the cassette modules 150 has the regular hexagonal cross-sectional shape, a cassette module may be in close contact with other adjacent cassette modules during layering cassette modules, so that efficient use of space may be realized.

A plurality of spacers 145 may be provided in a gap between the plurality of first cassette modules 160 and the plurality of second cassette modules 170. The partition wall 140 is provided between the plurality of first cassette modules 160 and the plurality of second cassette modules 170, so that spaces may be provided between the first cassette modules 160 and the partition wall 140, and between the second cassette modules 170 and the partition wall 140. Therefore, the plurality of spacers 145 are arranged in the spaces between the first cassette modules 160 and the partition wall 140, and between the second cassette modules 170 and the partition wall 140 to fill the spaces, thereby supporting the first cassette modules 160 and the second cassette modules 170.

The plurality of spacers 145 may be coupled to the partition wall 140 and formed to have a regular hexagonal cross section. In each of the spacers 145, a trapezoidal portion of a first side of the regular hexagonal cross section may be coupled to a first side of the partition wall 140, and a trapezoidal portion of a second side thereof may be coupled to a second side of the partition wall 140. In other words, each of the spacers 145 may be formed such that the trapezoidal sections are coupled to first and second side surfaces of the partition wall 140, respectively. Alternatively, the plurality of spacers 145 may be integrally formed by protruding from the first and second side surfaces of the partition wall 140.

Inside each of cassette modules 150, the plurality of reverse osmosis membrane units 200 may be arranged to be spaced apart from each other. In the enlarged view of FIG. 4A, a total of 7 reverse osmosis membrane units 200 are arranged in one cassette module 150 in a way in which 2-3-2 units are arranged based on each row, but the number of the reverse osmosis membrane units 200 may be provided variously.

Referring to FIG. 4B, the plurality of cassette modules 150 may be formed to have a regular triangular cross section. In this case, triangles of the cassette modules are layered to intersect each other in a zigzag, so that adjacent cassette modules may be arranged in close contact with each other.

Referring to FIG. 3, the reverse osmosis system according to the exemplary embodiment may include a feed pump 310 configured to feed pretreated seawater, the high pressure pump 320 configured to pump the seawater supplied from the feed pump 310 at high pressure, a first pressure exchanger 330 configured to exchange pressure of part of the seawater supplied from the feed pump 310 with part of high salinity water discharged from the high salinity water outlet 122 of the reverse osmosis apparatus 100, and a second pressure exchanger 350 configured to exchange pressure of part of the seawater supplied from the feed pump 310 with part of the high salinity water discharged from the high salinity water outlet 122 and to introduce the seawater into the transport space portion 130.

The reverse osmosis system may further include a first booster pump 340 configured to pump seawater supplied by the feed pump 310 and passing through the first pressure exchanger 330 at high pressure and to introduce the seawater into the inflow and outflow portion 120, and a second booster pump 360 configured to pump seawater supplied from the feed pump 310 and passing through the second pressure exchanger 350 at high pressure and to introduce the seawater into the transport space portion 130.

The feed pump 310 feeds part of the pretreated seawater to the high pressure pump 320 and supplies remaining pretreated seawater to both the first pressure exchanger 330 and the second pressure exchanger 350. The high pressure pump 320 pumps seawater at high pressure to feed the seawater to the inflow and outflow portion 120 through the seawater inlet 121.

The first pressure exchanger 330 exchanges pressure of part of the seawater with part of the high salinity water discharged from the high salinity water outlet 122. When the seawater fed from the feed pump 310 passes through the first pressure exchanger 330, the first booster pump 340 pumps the seawater at high pressure, so that the seawater may be fed into the inflow and outflow portion 120 while joining the seawater pumped by the high pressure pump 320.

The part of the seawater is fed from the feed pump 310 to the second pressure exchanger 350 and performs pressure exchange with the part of the high salinity water discharged from the high salinity water outlet 122. The second booster pump 360 may pump the seawater passing from the feed pump 310 through the second pressure exchanger 350 at high pressure and supply it to the transport space portion 130. The seawater fed to the transport space portion 130 may be diluted by joining seawater increasing in salinity while passing through the first reverse osmosis membrane units 160, and then may be fed into the second reverse osmosis membrane units 170.

According to the exemplary embodiments, as the reverse osmosis system is configured such that the pressure exchangers are connected to the inflow and outflow portion and the transport space portion, primary high salinity water in the transport space portion may be diluted and then fed into the second reverse osmosis membrane units arranged at the second stage, thereby recovering part of pressure energy.

Referring to FIG. 5A, each of the reverse osmosis membrane units 200 may include a cylindrical casing portion 210 having a reverse osmosis membrane therein and a head portion 220 coupled to one end of the casing portion 210 and having an outlet hole at a center portion thereof and inlet holes at positions around the center portion.

The head portion 220 may include a circular rim shaped main body 221 inserted into the one end of the casing portion 210, a hub 222 enclosing the outlet hole at the center portion thereof, and a plurality of blades 223 integrally connected between an outer circumferential surface of the hub 222 and an inner circumferential surface of the main body 221. The plurality of blades 223 may provide a plurality of inlet holes between the blades.

Inside the cylindrical casing portion 210, the reverse osmosis membrane may be arranged in a form surrounding a center portion corresponding to the outlet hole of the head portion 220 or a plurality of reverse osmosis membranes may be arranged to be layered. Accordingly, water may be collected into the center portion of the casing portion 210 by passing through the reverse osmosis membrane from the seawater introduced to the outside of the reverse osmosis membrane.

Referring to FIG. 5B, the head portion 220 may include the cylindrical main body 221 having the outlet hole and the inlet holes therein, a first connection tube 224 connected to a first side of the outlet hole, a second connection tube 226 connected to a second side of the outlet hole, and a reduced diameter portion 225 connected from a rim of the main body 221 to the second connection tube 226 with a decrease in a diameter of the head portion.

The head portion 220 in FIG. 5B may be configured such that the first connection tube 224 and the second connection tube 226 may be integrally connected to both sides of the hub 222 having the central outlet hole. When the head portion 220 has the first connection tube 224 and the second connection tube 226, the treated water tubes 180 and 190 may be easily connected to the first connection tube 224, and the reverse osmosis membrane may be easily mounted by being arranged around the second connection tube 226. A plurality holes may be formed on the reduced diameter portion 225 to allow fluid to pass through the holes.

The head portion 220 may further include a head seal 228 mounted to an outer circumferential surface of the main body 221 to seal a gap between the outer circumferential surface of the main body 221 and an inner circumferential surface of the casing portion 210 and a retaining ring 227 mounted to the outer circumferential surface of the main body 221 to fix the head portion 220 to the inner circumferential surface of the casing portion 210.

The outer circumferential surface of the main body 221 may have grooves to which the head seal 228 and the retaining ring 227 are mounted.

The head seal 228 may be made of a rubber material such as ethylene propylene diene monomer (EPDM), and the retaining ring 227 may be made of a stainless steel material.

Meanwhile, in the exemplary embodiments, the plurality of cassette modules 150 may be connected to each other in series and the plurality of reverse osmosis membrane units 200 provided in the cassette modules 150 may be connected to each other in series. In FIG. 2, three cassette modules 150 are connected to each other in series, and the series-connected cassette modules are simultaneously connected to each other in parallel.

Referring to FIG. 6A, one reverse osmosis membrane unit 200 and another reverse osmosis membrane unit 200 may be connected to each other in series by an adapter 230 connecting central flow paths of both the reverse osmosis membrane units while being inserted into outlet holes thereof.

As shown in FIG. 6A, the head seal 228 is provided on an outer circumferential surface of one end of each of the reverse osmosis membrane units 200, and the adapter 230 is inserted between center portion of both the reverse osmosis membrane units 200, thereby being coupled thereto. The adapter 230 may be coupled to high salinity water tubes 250 provided at the center portions of the reverse osmosis membrane units 200 while both ends of the adapter 230 are inserted into the high salinity water tubes 250. Each of the high salinity water tubes 250 is configured such that a plurality of through holes are formed on a circumferential surface thereof, so that produced water may be collected by low salinity water passing through the reverse osmosis membrane around the high salinity water tube 250 and flowing into the inside of the high salinity water tube 250.

Referring to FIG. 6B, the adapter 230 may include a first insertion tube 231 inserted into the outlet hole of the first-side reverse osmosis membrane unit 200, a second insertion tube 233 inserted into the outlet hole of the second-side reverse osmosis membrane unit 200, and a connection tube 232 connecting the first insertion tube 231 and the second insertion tube 233 into an integrated body and having an outer diameter larger than those of the first and second insertion tubes 231 and 233.

The first insertion tube 231 may be formed to have an outer diameter larger than that of the second insertion tube 233, and the first insertion tube 231, the connection tube 232, and the second insertion tube 233 may have flow paths therein to allow the water passing through the reverse osmosis membrane to be moved.

An adapter seal 234 may be mounted to an outer circumferential surface of an end of the first insertion tube 231, and two drinking water seals 235 may be mounted to an outer circumferential surface of an end of the second insertion tube 233. The adapter seal 234 may be made of a rubber material such as EPDM similar to the drinking water seals 235. The adapter seal 234 and the drinking water seals 235 may seal a connection portion between the two reverse osmosis membrane units 200 to prevent leakage of the production water.

Figure 7:
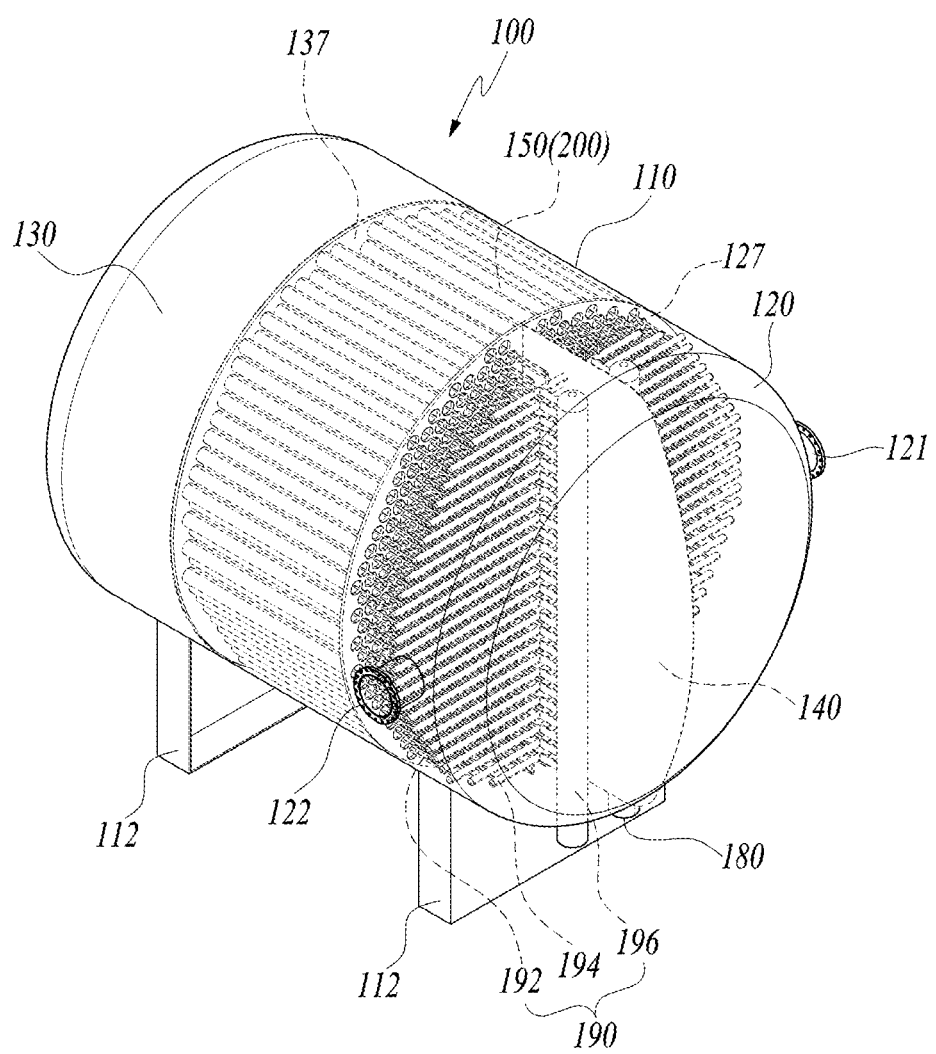
FIG. 7 is a partial perspective projection view showing a reverse osmosis apparatus having a tube sheet type vessel structure according to another exemplary embodiment.

FIG. 7 is a partial perspective projection view showing a reverse osmosis apparatus having a tube sheet type vessel structure according to another exemplary embodiment.

A plurality of reverse osmosis membrane units 150 may be formed in the tube sheet type in which a sheet-shaped reverse osmosis membrane is wrapped around the tube 250 (referring to FIG. 6A) having the plurality of through holes.

Referring to FIG. 7, the reverse osmosis apparatus 100 having the reverse osmosis membrane units of the tube sheet type includes the inflow and outflow portion 120 provided at the first end of the cylindrical vessel 110, the transport space portion 130 provided at the second end thereof, and a plurality of reverse osmosis membrane units 150 (200) arranged in the space between the inflow and outflow portion 120 and the transport space portion 130.

The cylindrical vessel 110 may be provided to be supported on the ground by a pair of supports 112 coupled to a lower portion of the vessel 110 by welding or fastening.

A partition wall 127 of the inflow and outflow portion 120 and a partition wall 137 of the transport space portion 130 may have through holes. The through holes of the partition walls 127 and 137 may be provided to allow the tubes of the plurality of reverse osmosis membrane units 200 to pass through the partition walls.

The plurality of first reverse osmosis membrane units 160 may be arranged in the space between the two partition walls 127 and 137 in the vessel 110. The permeated water generated by the plurality of first reverse osmosis membrane units 160 may be transported to the treated water tank 60 through the first treated water tubes 180, and the permeated water generated by the plurality of second reverse osmosis membrane units 170 may be transported to the BWRO 70 through the second treated water tubes 190.

The partition wall 140 may be provided in the inflow and outflow portion 120 perpendicular to the ground, the seawater inlet 121 may be provided on a first surface of the inflow and outflow portion 120, and the high salinity water outlet 122 may be provided on a second surface of the inflow and outflow portion 120.

Seawater introduced into the inflow and outflow portion 120 through the seawater inlet 121 is introduced into the plurality of first reverse osmosis membrane units 160, so that primarily reverse osmosis permeated water is transported into the treated water tank 60 through the first treated water tubes 180. High salinity water that has not passed through the reverse osmosis membrane is discharged to the transport space portion 130 and then flows into the plurality of second reverse osmosis membrane units 170, so that secondarily reverse osmosis permeated water is transported to the BWRO 70 through the second treated water tubes 190.

The first treated water tubes 180 are provided at an inflow side inside the inflow and outflow portion 120 to discharge the permeated water generated by the plurality of first reverse osmosis membrane units 160. The second treated water tubes 190 are provided at a discharge side inside the inflow and outflow portion 120 to discharge the permeated water generated by the plurality of second reverse osmosis membrane units 170.

A plurality of connection tubes 192 are respectively connected to a right end of the plurality of second reverse osmosis membrane units 170 arranged at the second stage. The plurality of connection tubes 192 are configured such that connection tubes arranged at the same level are connected to an intermediate connection tube 194, and a plurality of intermediate connection tubes 194 are connected to a collecting tube 196 arranged vertically. Accordingly, the permeated water may be transported to the BWRO 70 through the second treated water tubes 190. Likewise, the first treated water tubes 180 may include connection tubes, intermediate connection tubes, and a collecting tube, and may be formed to be symmetrical to the second treated water tubes 190.

The collecting tube of the first treated water tubes 180 and the collecting tube 196 of the second treated water tubes 190 may be respectively configured such that the permeated water is discharged downward through the inside of the inflow and outflow portion 120.

Figure 8:
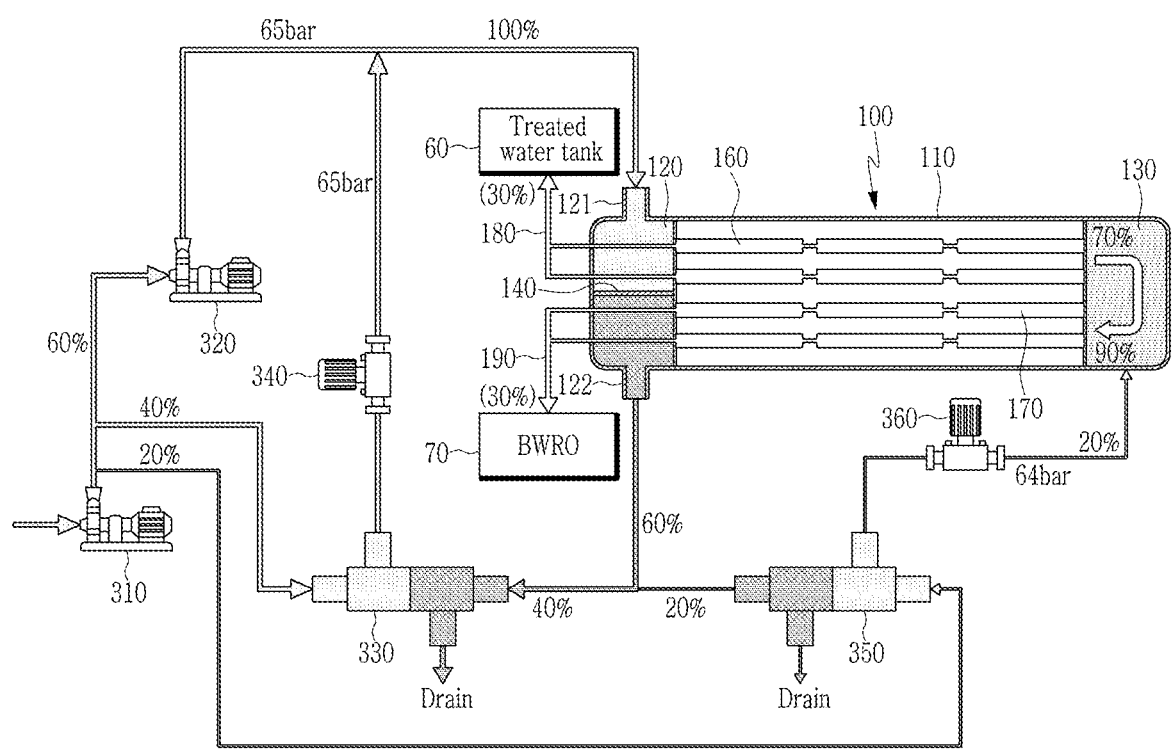
FIG. 8 is a view schematically showing a flow of water in the reverse osmosis system in FIG. 2.

FIG. 8 is a view schematically showing a flow of water in the reverse osmosis system in FIG. 3. Here, the seawater desalination process will be described with reference to FIG. 8.

Hereinbelow, the flow rate of seawater fed to the inflow and outflow portion 120 through the seawater inlet 121 refers to 100% reference flow rate.

By the feed pump 310, 60% of the pretreated seawater is fed to the high pressure pump 320, 40% of the seawater is fed to the first pressure exchanger 330, and 20% of the seawater is fed to the second pressure exchanger 350. The high pressure pump 320 pumps the seawater at high pressure of about 65 bar to feed the seawater to the inflow and outflow portion 120 through the seawater inlet 121.

100% of the seawater introduced into the inflow and outflow portion 120 passes through the plurality of first reverse osmosis membrane units 160, and 30% of the 100% of the seawater passes through the reverse osmosis membrane and then is transported to the treated water tank 60 through the first treated water tubes 180, and the remaining 70% of the 100% of the seawater is introduced into the transport space portion 130.

The 20% of the seawater is fed to the transport space portion 130 through the second pressure exchanger 350 and the second booster pump 360 at high pressure of 64 bar, and the 20% of the seawater and the 70% of the high salinity water in the transport space portion 130 are mixed to generate 90% of diluted water to be introduced into the plurality of second reverse osmosis membrane units 170.

30% of the diluted water passes through the reverse osmosis membrane in the plurality of second reverse osmosis membrane units 170 and then is transported to the BWRO 70 through the second treated water tubes 190, and the remaining 60% of the diluted water is introduced into the transport space portion 130 and then is discharged through the high salinity water outlet 122.

In the first pressure exchanger 330, the 40% of the seawater fed by the feed pump 310 exchanges pressure with 40% of the 60% of the high salinity water discharged from the high salinity water outlet 122. The seawater passed from the feed pump 310 through the first pressure exchanger 330 is pumped by the first booster pump 340 at high pressure of about 65 bar, and is mixed with the seawater pumped by the high pressure pump 320 to be fed to the inflow and outflow portion 120.

The 20% of the seawater fed by the feed pump 310 is fed to the second pressure exchanger 350 and exchanges pressure with 20% of the 60% of the high salinity water discharged from the high salinity water outlet 122. The seawater passed through the second pressure exchanger 350 by the feed pump 310 may be pumped by the second booster pump 360 at high pressure of about 64 bar to be fed to the transport space portion 130. The 20% of the seawater fed to the transport space portion 130 is mixed with the 70% of the seawater increased in salinity while passing through the plurality of first reverse osmosis membrane units 160 to generate the 90% of diluted water to be fed into the plurality of second reverse osmosis membrane units 170.

According to one or more exemplary embodiments, as the reverse osmosis system is configured such that the pressure exchangers are connected to the inflow and outflow portion and the transport space portion, primary high salinity water in the transport space portion may be diluted and then fed into the second reverse osmosis membrane units arranged at the second stage, thereby recovering part of pressure energy.

While one or more exemplary embodiments have been described with reference to the accompanying drawings, it is to be understood by those skilled in the art that various modifications and changes in form and details may be made therein without departing from the scope and spirit as disclosed in the accompanying claims. Accordingly, the description of the exemplary embodiments should be construed in a descriptive sense only and not to limit the scope of the claims, and many alternatives, modifications, and variations will be apparent to those skilled in the art.

What is claimed is:

1. A reverse osmosis system for a seawater desalination system, the reverse osmosis system comprising:
   a high pressure pump configured to supply pretreated seawater at high pressure;
   a reverse osmosis apparatus configured to desalinate by reverse osmosis the seawater supplied from the high pressure pump; and
   a pressure exchanger connected to a high salinity water outlet of the reverse osmosis apparatus and configured to recover part of pressure of discharged high salinity water to the reverse osmosis apparatus,
   wherein the reverse osmosis apparatus comprises:
   a vessel in which a plurality of reverse osmosis membrane units are arranged in a first stage and a second stage;
   an inflow and outflow portion coupled to a first end of the vessel and connected to a seawater inlet and a high salinity water outlet;
   a partition wall configured to partition an inner space of the inflow and discharge portion into two spaces; and
   a transport space portion coupled to a second end of the vessel and configured to guide the seawater moved from a plurality of reverse osmosis membrane units arranged in the first stage to move to a plurality of reverse osmosis membrane units arranged in the second stage.

2. The reverse osmosis system of claim 1, wherein the plurality of reverse osmosis membrane units arranged in the vessel comprises:
   a plurality of first reverse osmosis membrane units arranged in a space of the first stage and configured to reduce salinity of the seawater supplied from the inflow and discharge portion; and
   a plurality of second reverse osmosis membrane units arranged in a space of the second stage and configured to reduce salinity of the seawater supplied from the transport space portion.

3. The reverse osmosis system of claim 2, further comprising:
first treated water tubes connected to first ends of the plurality of first reverse osmosis membrane units and connected to an outside of the vessel by passing through the inflow and discharge portion; and
second treated water tubes connected to first ends of the plurality of second reverse osmosis membrane units and connected to the outside of the vessel by passing through the inflow and discharge portion.

4. The reverse osmosis system of claim 3, wherein the plurality of first and second reverse osmosis membrane units are arranged in a cassette type in which the reverse osmosis membrane units are arranged in parallel to be spaced apart from each other in the cassette.

5. The reverse osmosis system of claim 4, wherein the plurality of first and second reverse osmosis membrane units are configured such that 3 to 10 reverse osmosis membrane units having a regular hexagonal, square, or regular triangular cross-section are connected to each other in series.

6. The reverse osmosis system of claim 2, wherein the plurality of first and second reverse osmosis membrane units are configured in a form of a tube sheet in which a sheet-shaped reverse osmosis membrane unit is wound around a tube having a plurality of through holes.

7. The reverse osmosis system of claim 1, further comprising:
a feed pump configured to supply the pretreated seawater;
the high pressure pump configured to pump the seawater supplied from the feed pump at high pressure;
a first pressure exchanger configured to perform pressure exchange between a part of the seawater supplied from the feed pump and a part of the high salinity water discharged from the high salinity water outlet; and
a second pressure exchanger configured to perform pressure exchange between a part of the seawater supplied from the feed pump and a part of the high salinity water discharged from the high salinity water outlet and to introduce the seawater into the transport space portion.

8. The reverse osmosis system of claim 7, further comprising:
a first booster pump configured to pump the seawater supplied from the feed pump and passed through the first pressure exchanger at high pressure to move to the inflow and discharge portion; and
a second booster pump configured to pump the seawater supplied from the feed pump and passed through the second pressure exchanger at high pressure to move to the transport space portion.

9. The reverse osmosis system of claim 1, wherein each of the reverse osmosis membrane units comprises:
a cylindrical casing portion having a reverse osmosis membrane therein; and
a head portion coupled to one end of the casing portion and having an outlet hole at a center portion thereof and inlet holes at positions around the center portion.

10. The reverse osmosis system of claim 9, wherein one of the reverse osmosis membrane units and another reverse osmosis membrane unit are connected to each other in series by an adapter that is inserted into outlet holes of both the reverse osmosis membrane units to connect central flow paths thereof to each other.

11. A seawater desalination system comprising:
a pretreatment apparatus configured to intake seawater and filter impurities in the introduced seawater;
a cartridge filter configured to re-filter the water pretreated by the pretreatment apparatus; and
a reverse osmosis system configured to receive the water filtered by the cartridge filter from a high pressure pump to produce fresh water by reverse osmosis,
wherein the reverse osmosis system comprises:
a vessel in which a plurality of reverse osmosis membrane units are arranged in a first stage and a second stage;
an inflow and outflow portion coupled to a first end of the vessel and connected to a seawater inlet and a high salinity water outlet;
a partition wall configured to partition an inner space of the inflow and discharge portion into two spaces; and
a transport space portion coupled to a second end of the vessel and configured to guide the seawater moved from a plurality of reverse osmosis membrane units arranged in the first stage to move to a plurality of reverse osmosis membrane units arranged in the second stage.

12. The seawater desalination system of claim 11, wherein the plurality of reverse osmosis membrane units arranged in the vessel comprises:
a plurality of first reverse osmosis membrane units arranged in a space of the first stage and configured to reduce salinity of the seawater supplied from the inflow and discharge portion; and
a plurality of second reverse osmosis membrane units arranged in a space of the second stage and configured to reduce salinity of the seawater supplied from the transport space portion.

13. The seawater desalination system of claim 12, wherein the reverse osmosis system further comprises:
first treated water tubes connected to first ends of the plurality of first reverse osmosis membrane units and connected to an outside of the vessel by passing through the inflow and discharge portion; and
second treated water tubes connected to first ends of the plurality of second reverse osmosis membrane units and connected to the outside of the vessel by passing through the inflow and discharge portion.

14. The seawater desalination system of claim 13, wherein the plurality of first and second reverse osmosis membrane units are arranged in a cassette type in which the reverse osmosis membrane units are arranged in parallel to be spaced apart from each other in the cassette.

15. The seawater desalination system of claim 14, wherein the plurality of first and second reverse osmosis membrane units are configured such that 3 to 10 reverse osmosis membrane units having a regular hexagonal, square, or regular triangular cross-section are connected to each other in series.

16. The seawater desalination system of claim 12, wherein the plurality of first and second reverse osmosis membrane units are configured in a form of a tube sheet in which a sheet-shaped reverse osmosis membrane unit is wound around a tube having a plurality of through holes.

17. The seawater desalination system of claim 11, wherein the reverse osmosis system further comprises:
a feed pump configured to supply the pretreated seawater;
the high pressure pump configured to pump the seawater supplied from the feed pump at high pressure;
a first pressure exchanger configured to perform pressure exchange between a part of the seawater supplied from the feed pump and a part of the high salinity water discharged from the high salinity water outlet; and
a second pressure exchanger configured to perform pressure exchange between a part of the seawater supplied from the feed pump and a part of the high salinity water discharged from the high salinity water outlet to introduce the seawater into the transport space portion.

18. The seawater desalination system of claim 17, wherein the reverse osmosis system further comprises:
- a first booster pump configured to pump the seawater supplied from the feed pump and passed through the first pressure exchanger at high pressure to move to the inflow and discharge portion; and
- a second booster pump configured to pump the seawater supplied from the feed pump and passed through the second pressure exchanger at high pressure to move to the transport space portion.

19. The seawater desalination system of claim 11, wherein each of the reverse osmosis membrane units comprises:
- a cylindrical casing portion having a reverse osmosis membrane therein; and
- a head portion coupled to one end of the casing portion and having an outlet hole at a center portion thereof and inlet holes at positions around the center portion.

20. The seawater desalination system of claim 19, wherein one of the reverse osmosis membrane units and another reverse osmosis membrane unit are connected to each other in series by an adapter that is inserted into outlet holes of both the reverse osmosis membrane units to connect central flow paths thereof to each other.

* * * * *